United States Patent [19]
Lamson et al.

[11] Patent Number: 5,429,289
[45] Date of Patent: Jul. 4, 1995

[54] SAFETY LEASH

[75] Inventors: William C. Lamson, Huntington; Richard L. Caldwell, Winsted, both of Conn.

[73] Assignee: Unger Licensing Inc., Bridgeport, Conn.

[21] Appl. No.: 224,760

[22] Filed: Apr. 8, 1994

[51] Int. Cl.⁶ ............................................. A45F 5/00
[52] U.S. Cl. .................................. 224/269; 224/252; 224/904; 24/580; 24/543; 24/371; 24/601.2; 24/601.4
[58] Field of Search ............... 224/103, 180, 251, 903, 224/904, 915, 922, 252, 269, 268, 270; 24/327, 580, 543, 326, 371, 372, 373, 601.1, 601.2, 601.4

[56] References Cited

U.S. PATENT DOCUMENTS

| | | | |
|---|---|---|---|
| 439,423 | 10/1890 | Potts | 224/915 |
| 1,488,594 | 4/1924 | Gaschke | 24/543 |
| 1,511,704 | 10/1924 | Buck | 24/326 |
| 2,354,848 | 8/1944 | Carpenter | 224/103 |
| 2,628,396 | 10/1950 | Grimes et al. | 24/543 |
| 3,111,734 | 11/1963 | Pachner | 224/103 |
| 3,358,484 | 2/1966 | Le Page | 24/543 |
| 3,519,177 | 7/1970 | Voinovich | 224/268 |
| 4,440,334 | 4/1984 | Kappel et al. | 224/268 |

*Primary Examiner*—J. Casimer Jacyna
*Assistant Examiner*—Timothy L. Maust
*Attorney, Agent, or Firm*—Abelman, Frayne & Schwab

[57] ABSTRACT

A leash is provided for securing tools to a relatively fixed member to ensure against free fall of the tools in the event that they are dropped by a workman. Spring clips at the ends of the leash have arms that interlock, and respectively are receivable within an aperture in a tool and in clamping engagement around the periphery of a pole, tool, or other member, in order to tether the tool to a member capable of retaining the tool in the event of free fall of the tool.

13 Claims, 10 Drawing Sheets

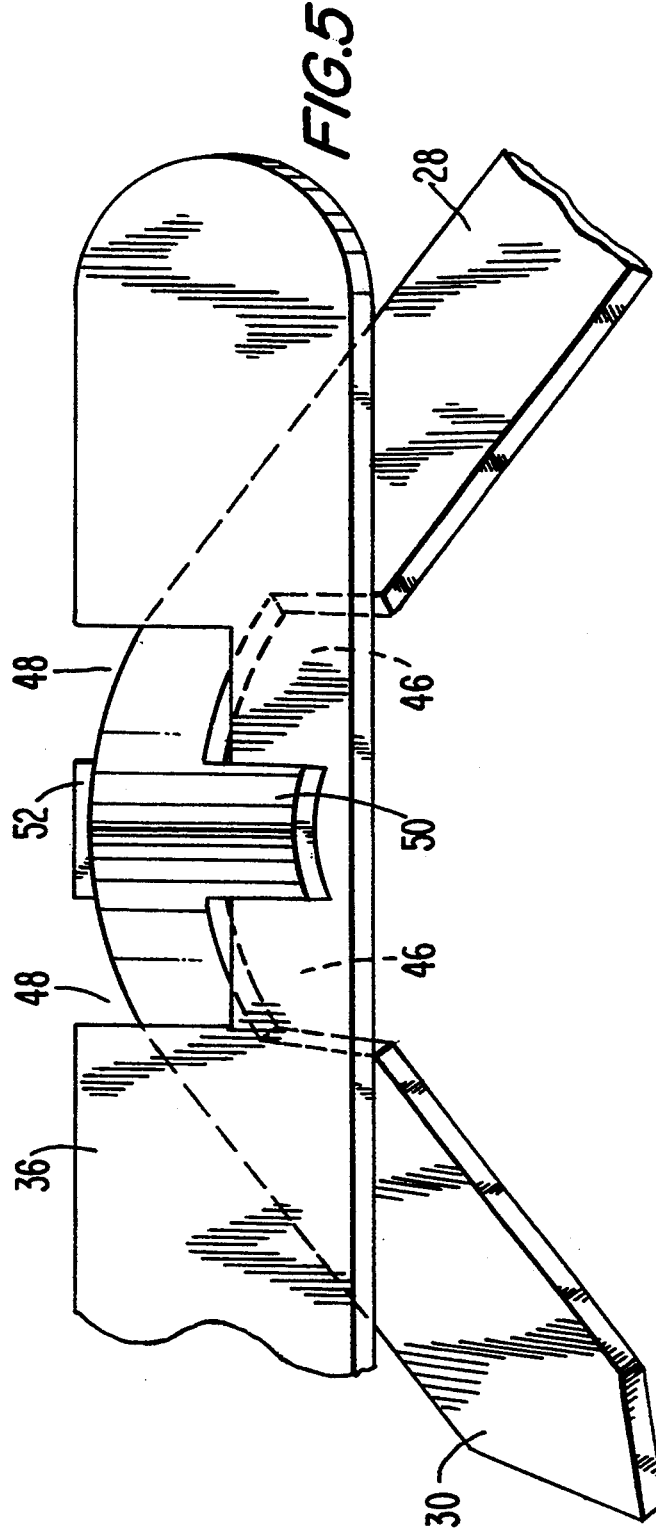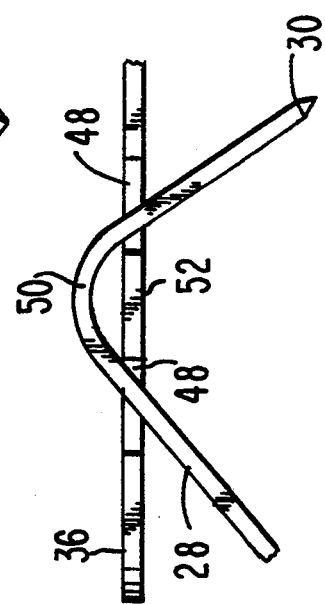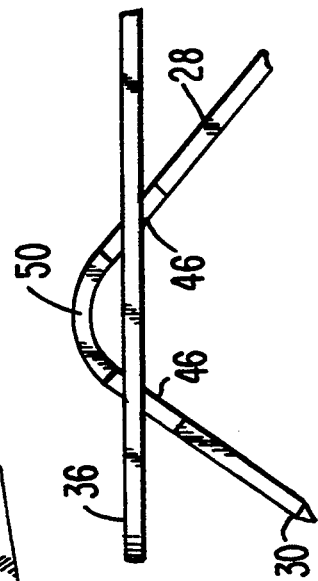

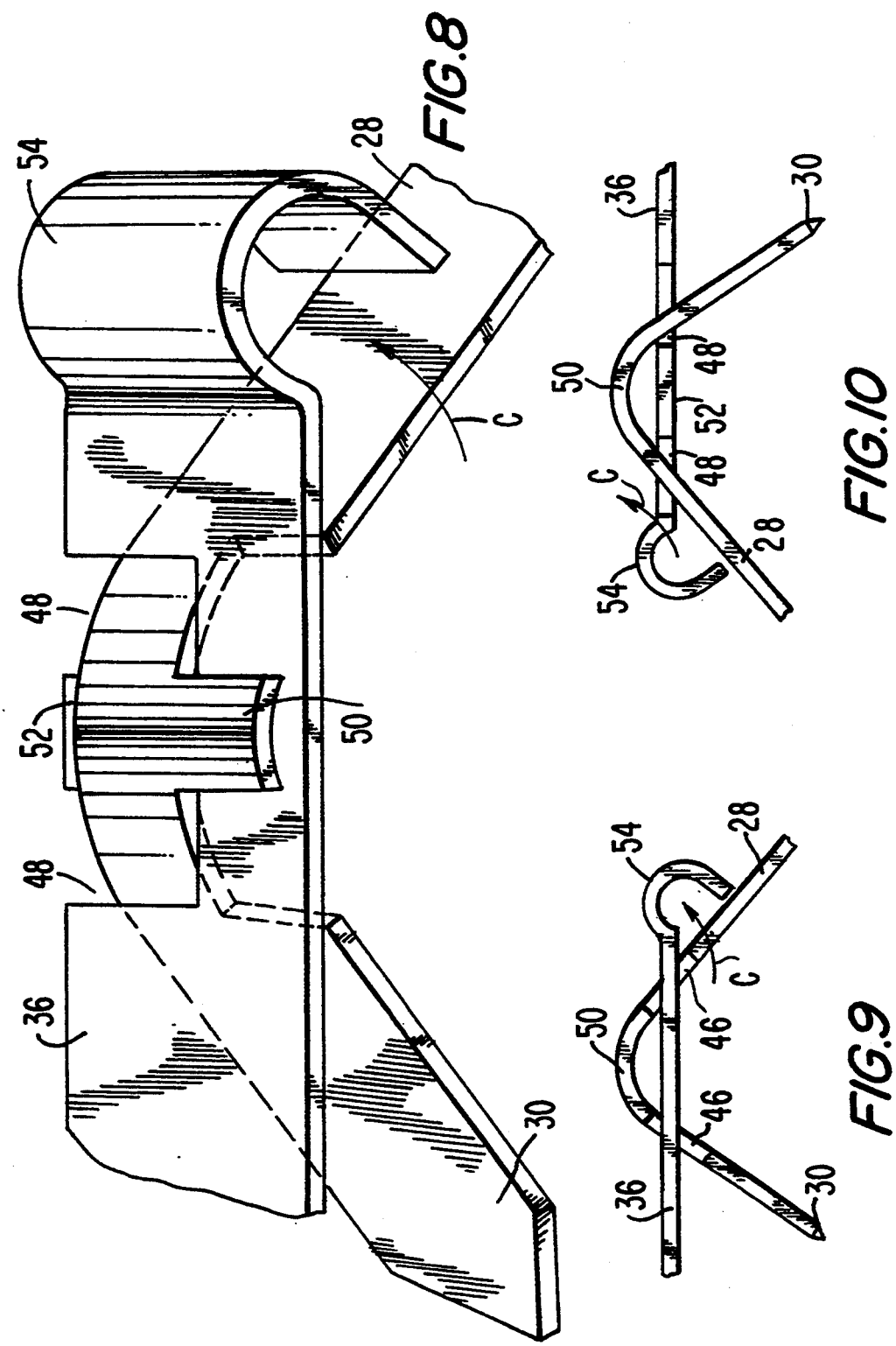

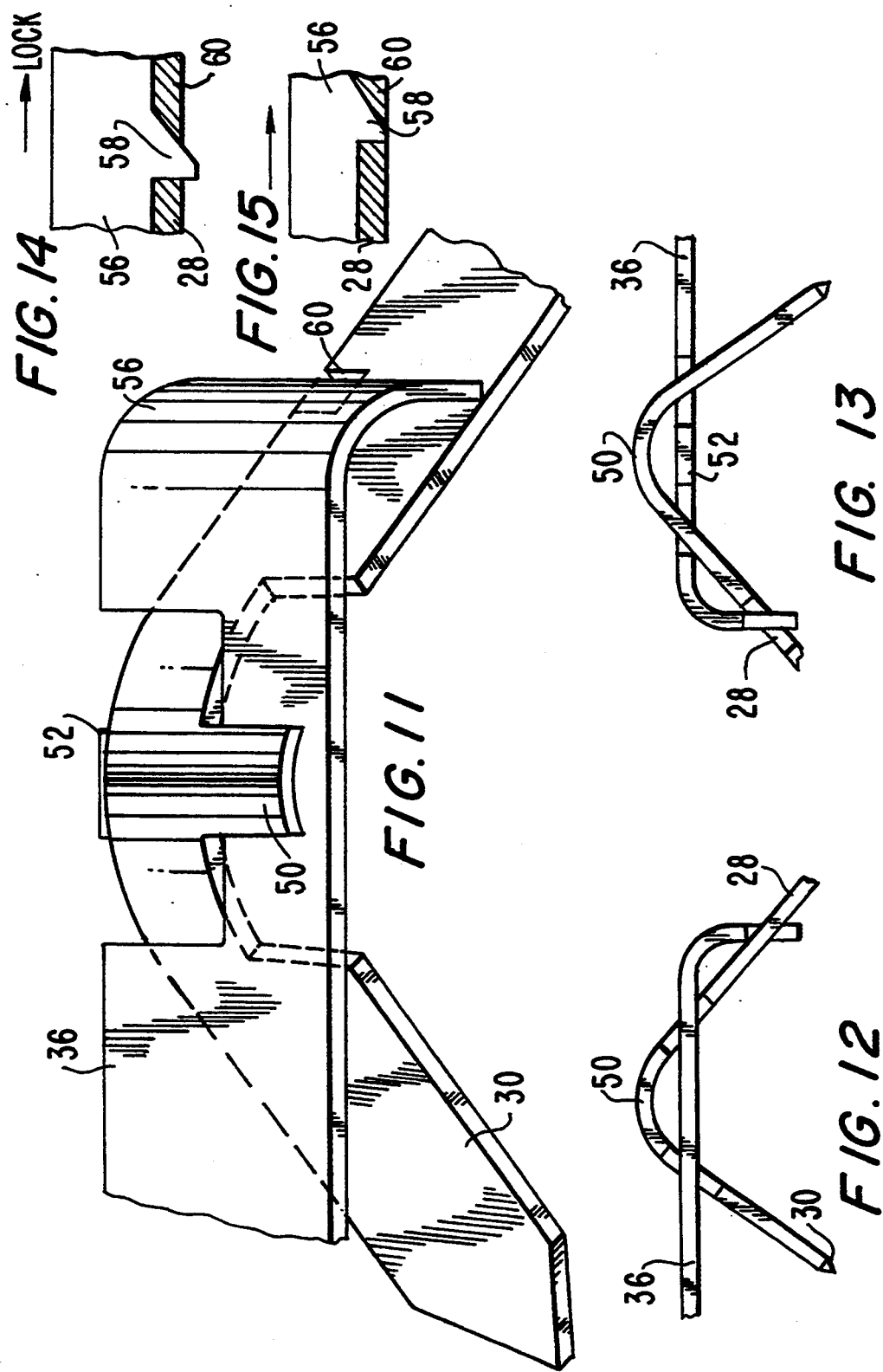

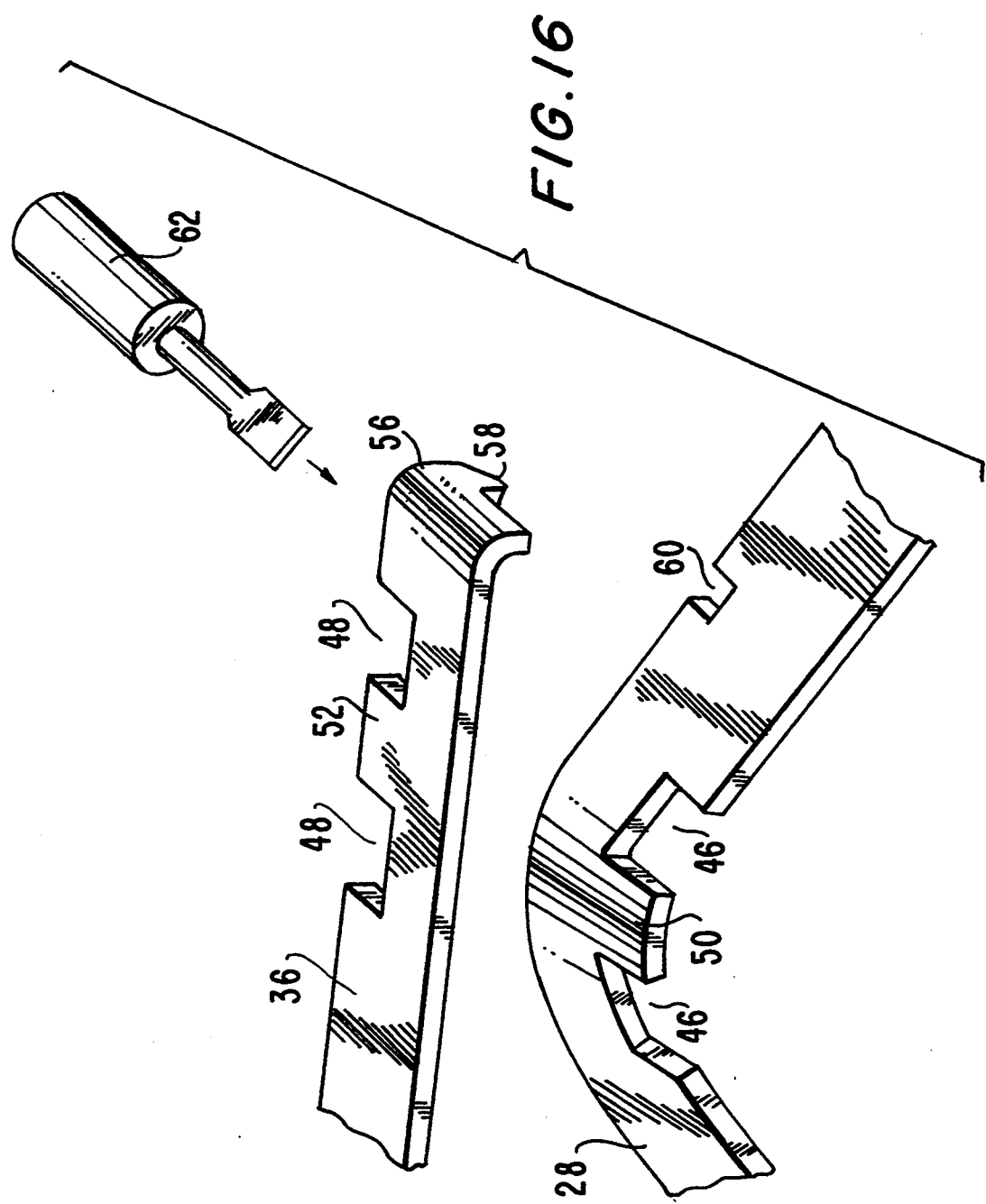

/ 1

SAFETY LEASH

FIELD OF THE INVENTION

This invention relates to a safety leash for use in securing tools against accidental dropping of the tools from a height, particularly tools used by window washers, and also, tools such as screw-drivers, wrenches, files, scrapers, paint rollers, paint brushes, and the like that are used by workmen in the practice of their trades.

BACKGROUND OF THE INVENTION

Window washers commonly work in locations high above a crowded street. Also, plumbers, electricians, and painters commonly are required to work on high level platforms or rigging when working on ceiling areas of a building, which again can be high above the floor of the building.

The accidental dropping of a tool by a workman can pose extreme hazard to persons located in the area beneath the work area, the tool, if dropped, being capable of causing bodily injury to any person on which the tool impacts.

Window washers commonly are required to employ large squeegees in the performance of their work. Plumbers and pipefitters are required to employ heavy wrenches in the performance of their work. Electricians are required to employ heavy screw drivers, and side-cutting pliers in the performance of their work. Painters, are required to employ scrapers, paint rollers, and sanding blocks in the performance of their work. The above-named tools and implements are representative only of an enormous variety of tools and implements used in various trades for various purposes. Such tools and implements usually are hand-held by the workmen, usually in the absence of a tether or leash that attaches the tool or implement either to a structure in the immediate vicinity of the workman, or, more commonly, to a tool belt worn by the workman when working in elevated locations.

While it is possible to provide apertures in the respective tools in order to pass a leash through the handle of that tool, and then tie the leash to the workman's tool belt, such an operation is an entirely cumbrous one, and, one which is entirely unpredictable in its efficiency. The workman can intentionally omit to tie the leash to the workman's tool belt, or, can tie it to the workman's tool belt inappropriately, or, discard the leash. Such leashes can be inconvenient and an annoyance to the workman.

Further, in the event that the tool accidentally is dropped by the workman, there is no guarantee that the leash has been made sufficiently secure, in which event the tool can possibly break away from the leash, and continue its downward descent in free fall.

OBJECT OF THE INVENTION

It is an object of this invention to provide a safety leash that will provide a high degree of safety in the event that a workman should accidentally drop a tool with which he is working.

It is also an object of this invention to provide a clip for a safety leash that will automatically lock in a closed position when properly applied to a tool or a workman's tool belt, and which cannot be accidentally released, intentional tampering with the clip being required in order to effect opening of the clip and its release from the object to which it is attached.

Another object of this invention is to provide such a clip for securing a safety leash that is capable of withstanding physical impacts, without causing opening of the clip, such impacts occurring in the event that the clip is impacted, for example, on a window ledge or on a building girder either during use of the tool to which it is attached, or, during the downward descent of the tool when accidentally dropped.

SUMMARY OF THE INVENTION

According to the present invention, a safety leash of the present invention includes a leash, and a clip attached to the leash, the clip being formed from a length of spring steel providing a central axially continuous portion, a first arm integral with said central portion at one end of said central portion, a second arm integral with said central portion at an opposite end of said central portion, and, interlocking means formed in said first and second arms for securing said first and second arms to each other in a closed position of said spring clip.

According to a further feature of the present invention, the said central portion, and said first and second arms each lie in a common plane, whereby forces exerted on said spring clip are transmitted throughout said spring clip substantially as "in line" tensional forces when said spring clip is in said closed position.

According to a further feature of the present invention, an eyelet is formed at one end of said central portion for the reception of a leash that is permanently affixed to said spring clip.

According to a further feature of the present invention, an opposite end of said central portion is configured to provide a bight for the reception of a portion of a tool, with said bight portion of said spring clip extending through an aperture in a wall of said tool.

According to a further feature of the present invention, an end of one of said first and second arms is configured as a piercing tool for perforating a friction grip formed of elastomeric material provided on an outer surface of said tool.

According to a further feature of the present invention, said piercing tool is positioned entirely within the confines of said spring clip when said spring clip is in a closed and secured position.

According to a further feature of the present invention, one of said first and second arms is configured to encircle and embrace a peripheral surface of a tool, and, to be held in compressive frictional relation with said peripheral surface of said tool, when said spring clip is in a closed and secured position.

According to a further feature of the present invention, the central portion of said spring clip is axially straight between the ends thereof, in order to transmit forces exerted on one end of said central portion into a tensile force exerted on said central portion, in the absence of lateral and twisting forces.

According to a preferred feature of the present invention, said respective arms of said clip are configured for them to inter-fit in a manner restraining axial movement of said first and second arms relative to each other.

According to a further preferred feature of the present invention, said first and second axis include interfitting tabs, or, one of said first and second arms includes a detent which is received under spring force in an aperture of the other of said arms when said arms are moved into a closed and secured position, whereby unintentional release of said arms from one another is inhibited.

DESCRIPTION OF THE DRAWINGS

Preferred embodiments of the present invention will now be described with reference to the accompanying drawings, in which:

FIG. 5 shows the manner in which arms of the spring clip interlock;

FIG. 6 is a front elevation of FIG. 5;

FIG. 7 is a rear elevation of FIG. 5;

FIG. 8 is a view corresponding with FIG. 5, and showing a modification of the spring clip;

FIG. 9 is a front elevation of FIG. 8;

FIG. 10 is a rear elevation of FIG. 8;

FIG. 11 shows an alternative manner of positively locking the arms of the spring clip against accidental lateral movement relative to each other;

FIG. 12 is a front elevation of FIG. 11;

FIG. 13 is a rear elevation of FIG. 11;

FIGS. 14 and 15 show details of the locking detents;

FIG. 16 is an exploded perspective view of FIG. 11;

DESCRIPTION OF THE PREFERRED EMBODIMENTS

Figure 1:
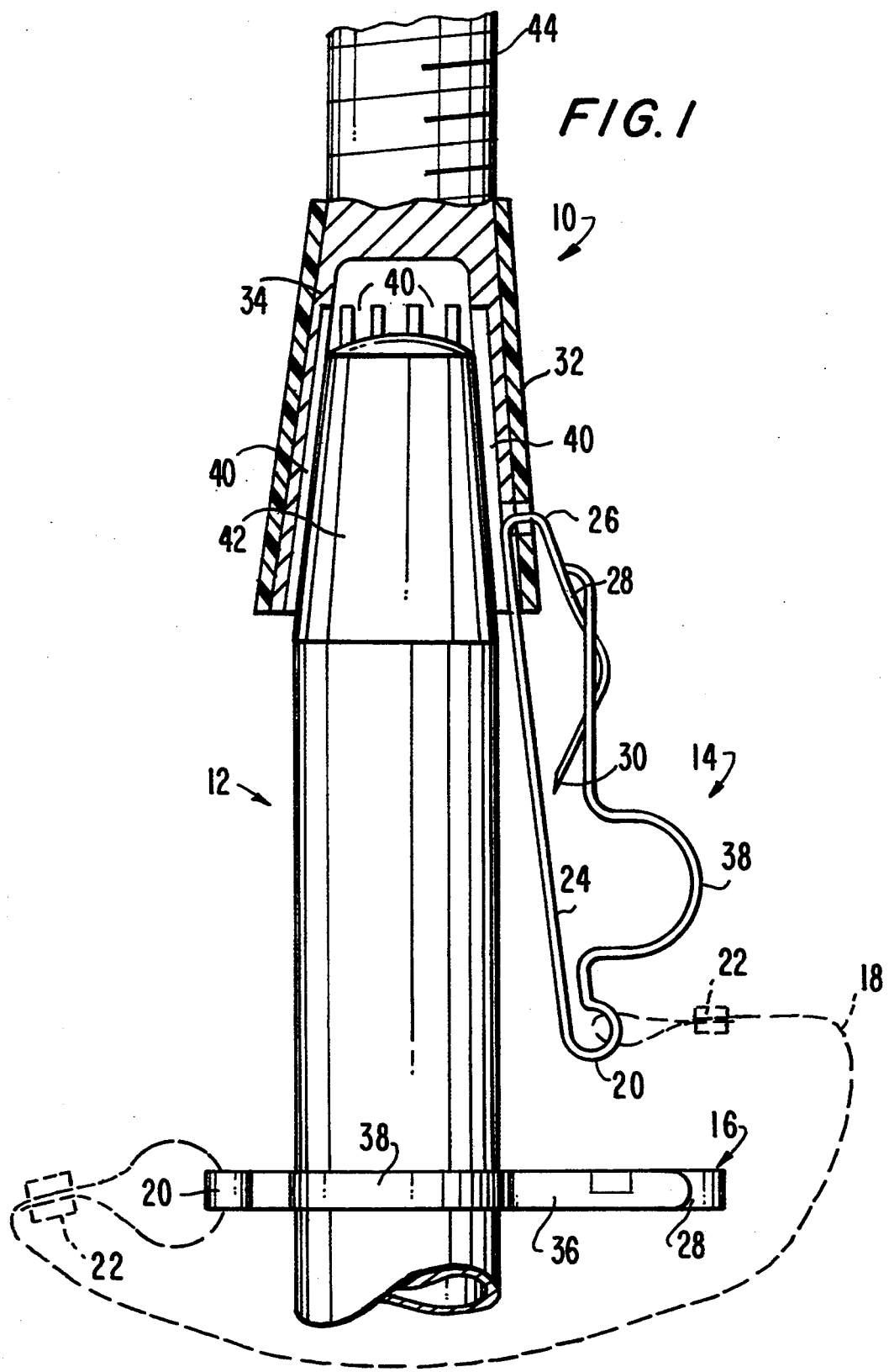
FIG. 1 is a part-sectional view of a shank of a window washer's tool, such as a squeegee, which is frictionally secured to a window washer's pole, the shank and the pole being interconnected one with the other by means of a leash having a spring clip of the present invention attached to each of the ends thereof.

Referring to FIG. 1, a tool holder, which itself can be a complete tool is indicated at 10, the tool being a frictional force-fit on an end of a pole, indicated at 12. Clearly, in the basic construction so far described, an impact on the tool holder 10 could cause displacement of the tool holder 10, and, the total detachment of the tool holder 10 from the end of the pole 12. In such a circumstance, the tool holder 10 is then free to fall, with the possible consequence of injury to persons in the path of fall of the tool holder 10.

That possibility is eliminated according to the teachings of the present invention by attaching a spring clip 14 to the tool holder 10, and by attaching an identical spring clip 16 to the pole 12, the spring clips 14 and 16 being interconnected by a leash or lanyard 18 that is permanently attached to the spring clips 14 and 16.

The leash 18 can be of any known construction, which, conveniently is that of a core formed of intertwisted metal or plastic strands, such as steel wires or continuous nylon filaments, the core being encased in a sheath, that sheath being conveniently of an extrudable plastics material, such as polytetrafluoroethylene.

The leash 18 is looped through eyelets 20 of the respective spring clips 14 and 16, and, has the respective ends of the leash 18 secured to the body of the leash 18 by means of crimped rings 22, in a manner entirely well-known in the art.

The respective spring clips 14 and 16, which are identical one with the other, are formed from strip spring steel, and each include a central axially straight continuous portion 24, the central axially straight continuous portion 24 continuing at one of its ends into an eyelet 20. The opposite end of the central axially straight continuous portion 24 proceeds into a bight 26, which, in FIG. 1 extends through an aperture in the side wall of the tool 10. The bight 26 then continues into a first arm 28, the arm 28 terminating at its free end in a cutting point 30, whereby an elastomeric covering 32 providing a frictional grip on the shank 34 of the tool holder 10 easily can be pierced by the cutting point 30 by forcing the cutting point through the elastomeric covering from inside the tool holder 10 to allow the bight 26 of the clip 14 to be moved into the position shown in FIG. 1.

The eyelet 20 continues into a second arm 36, which is appropriately arcuately configured at 38 for it to extend around a pole, such as the pole 12, and be held in compressive frictional relation with respect to the outer surface of the pole upon closure of the spring clip, in this instance, the spring clip 16.

At its free end, the second arm 36, as is later described, is provided with locking formations, enabling it to be locked to the first arm 28, thus to provide for locking of either the spring clip 14 or 16 in a closed position. In that closed position, the spring clip 14 is connected directly to the tool holder 10, and, by means of the leash 18 is connected directly to the spring clip 16, the spring clip 16 itself being firmly attached to the pole 12.

Thus, in the event that the tool holder 10 works loose off the end of the pole 12, or is forcibly removed from the end of the pole 12 by an impact on the tool holder 10, the tool holder 10 remains directly attached to the pole 12 by the spring clips 14 and 16 and the interconnecting leash 18. The tool holder can then only fall by a distance which is that of the combined lengths of the spring clip 14 and the leash 18.

Tool holders, as used by window washers, commonly are provided with axially extending ribs 40 on their inner periphery, the purpose of those ribs being to permit the escape of air and water from the interior of the tool holder 10 upon insertion of the pole 12, and in order to improve the frictional grip of the tool holder 10 on the frusto-conical end 42 of the pole 12.

The spring clip of the present invention takes advantage of that construction by providing a spring clip, such as the spring clips 14 and 16 that are of a thickness no greater, and preferably less than the depth of the ribs 40, this allowing the central axially straight portion of the spring clip 14 to be positioned spaced from the frusto-conical surface 42 of the pole 12, and in a position in which it in no way interferes with the frictional grip of the ribs 40 on the frusto-conical portion 42.

While a specific use of the spring clip of the present invention has been described with reference to FIG. 1, it will be appreciated that the spring clip and leash construction so far described has multiple uses, depending upon the specific circumstances that are encountered in use by a workman.

For example, a spring clip such as the one 16 can be attached to the pole 12, and, a spring clip such as the one 14 can be attached directly to the workman's tool belt. In that event, if the workman drops the pole 12 itself, then, the entire structure remains tethered to the workman's tool belt by the leash 18, and, in the event that the workman should intentionally remove the tool holder from the pole 12, then, both the tool holder and the pole remain tethered to the workman.

In the alternative, the spring clip 16 can be attached to a rung of a ladder or a strut of scaffold on which the workman is standing, this, again resulting in the tool being tethered in its entirety and prevented from free fall.

While the invention has so far been described with reference to tools commonly employed by window washers, it will readily be appreciated that by minor modification of the arcuate portion 38, the spring clip 14 can be configured for it to be attached to a tool of any other shape, such as a plumber's wrench, a screw driver, pliers, scrapers, paint rollers, sanding blocks and the like such as are used by workmen in other trades, the opportunity existing either of inserting the spring clip 14 into an eyelet of the tool, or, clamping the spring clip 14 to a shank of the tool by means of the arcuate portion 38.

Typically in the embodiment illustrated in FIG. 1, a window washer's squeegee or washing tool would be attached to the threaded shank 44, that threaded shank being useable, for example, by painters for threading into the handle of a paint roller or a paint scraper, or, into the shoe of a sanding block, such as is commonly used by painters or wall board papers.

In its basic concept, the spring clip and tether arrangement of the present invention provides for the attachment of any hand-held tool to another member, such that the hand-held tool, if dropped by the workman, is tethered against free-fall, and thus, does not pose a hazard to persons positioned beneath the workman.

Figure 2:
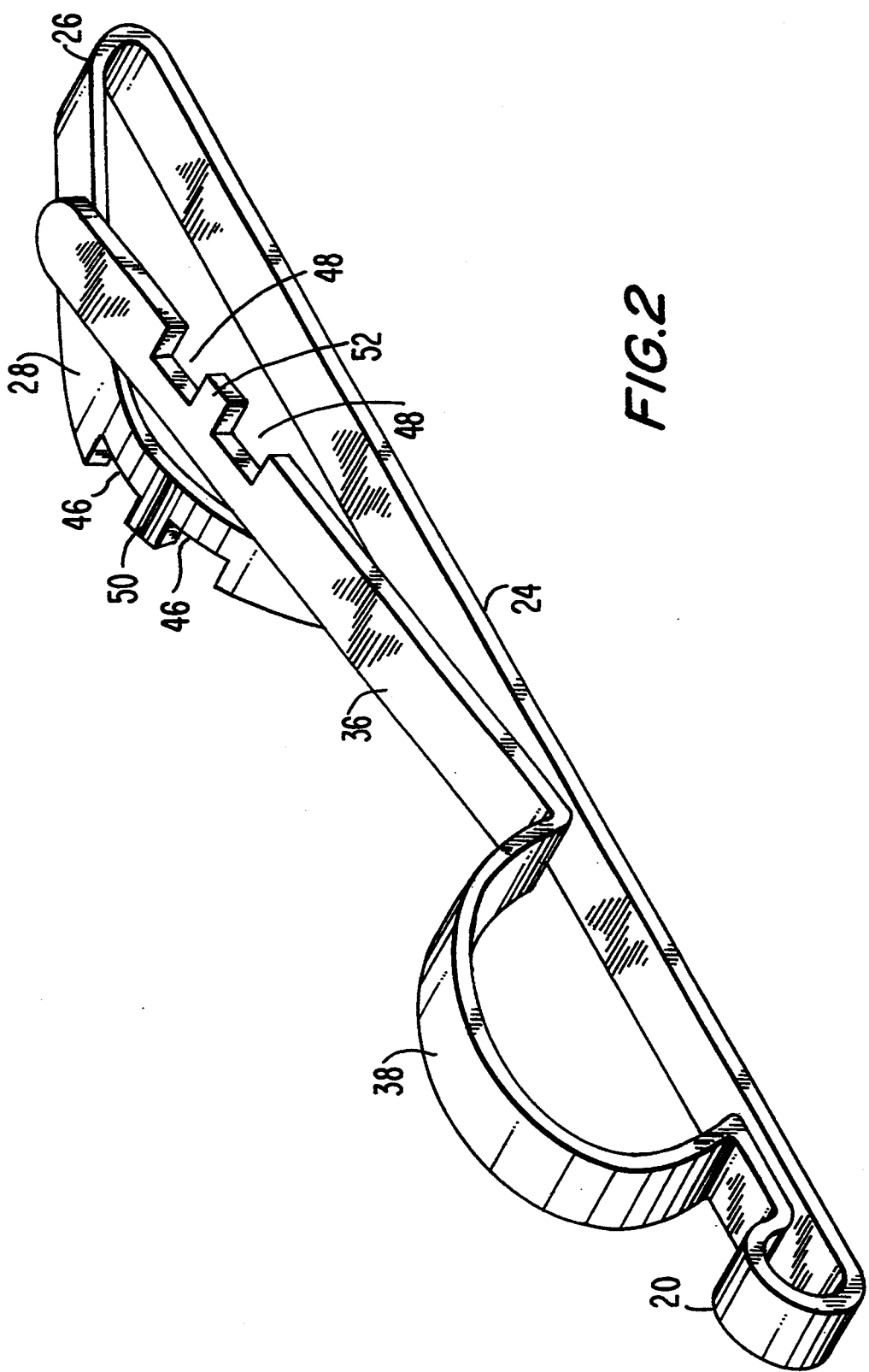
FIG. 2 shows the spring clip prior to closure and securement.
Figure 3:
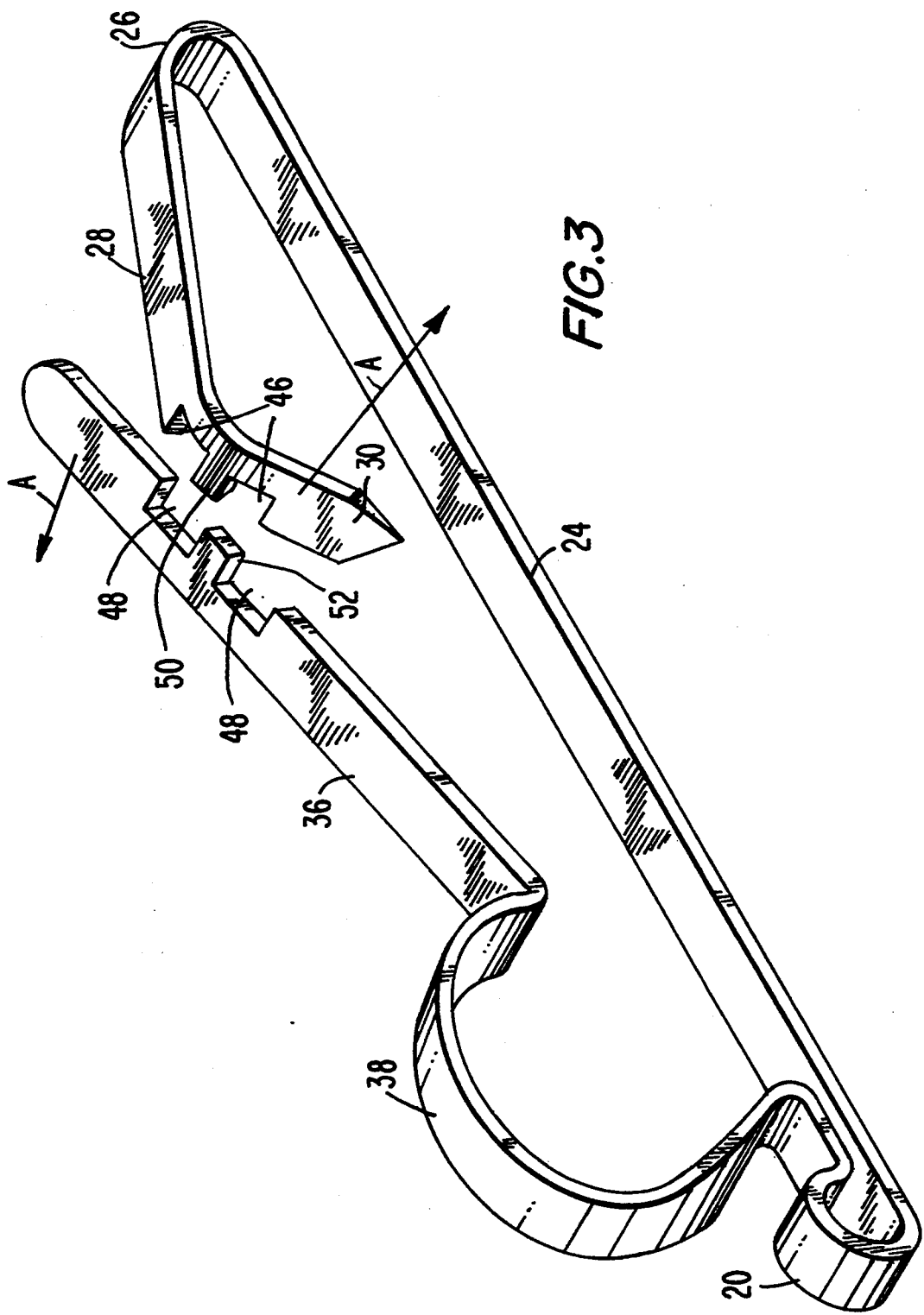
FIG. 3 shows the manner in which the spring clip is closed.
Figure 4:
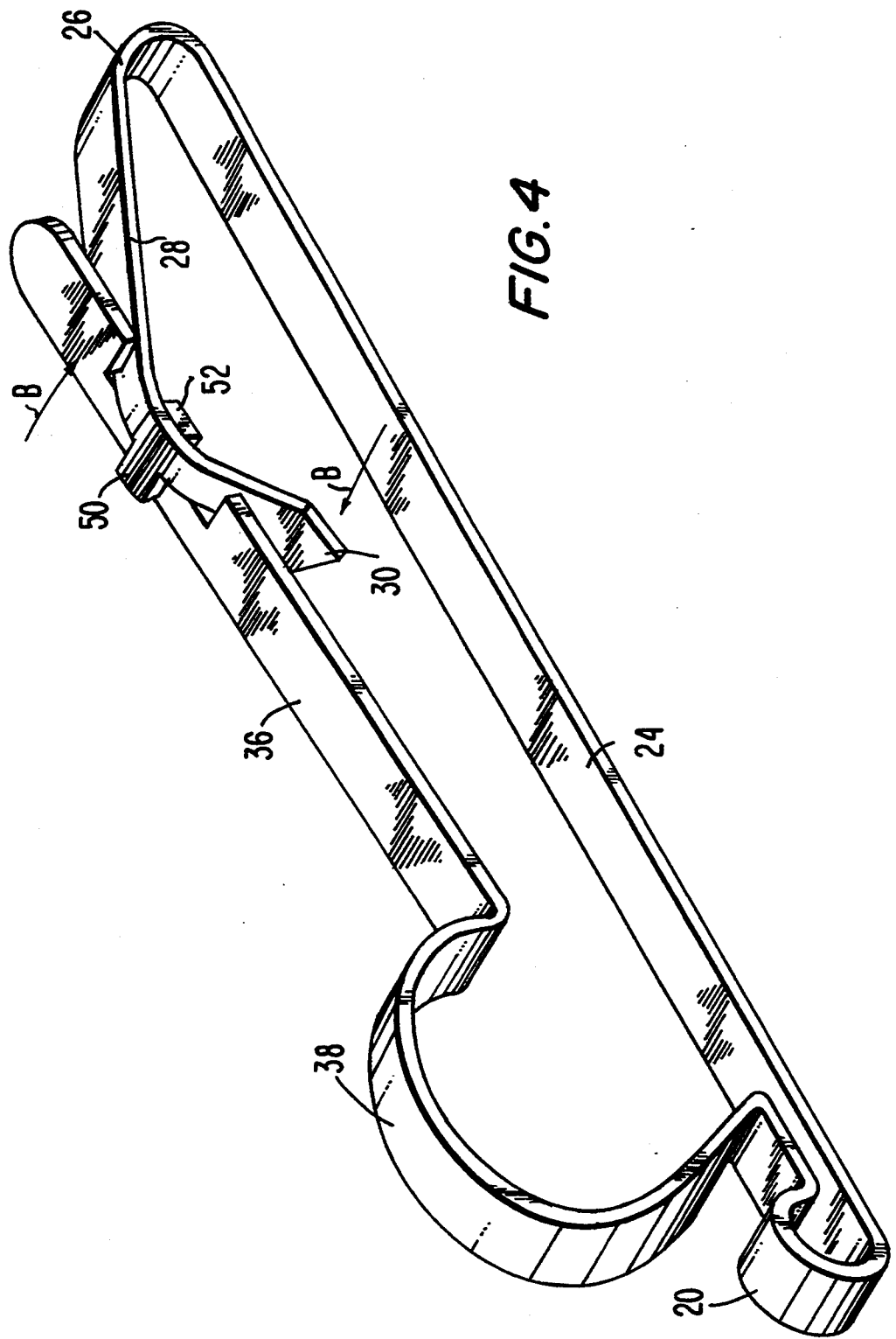
FIG. 4 shows the spring clip in a closed and secured position.

Referring now to FIGS. 2, 3 and 4, the spring clip is shown in greater detail, and, is described with respect to its manner of use.

Referring firstly to FIG. 2, it will be seen that the arms 28 and 36 are not in axial alignment with the axially straight central portion 24, the first arm 28 being displaced at an angle in one direction relative to the central portion 24, the second arm 36 being displaced in an opposite direction relative to the central portion 24, such that, in the initial position of the spring clip, the arms 28 and 36 extend substantially parallel to one another in side-by-side relation, and, at an angle to the central portion 24.

To assemble and lock the clip, and as illustrated in FIG. 3, the arms 28 and 36 are pushed in opposite directions as indicated by the arrows A, this acting to reversely stress the arms 28 and 36 against a strong spring bias, as provided by the body of the spring clip itself.

Having reached the condition shown in FIG. 3, the arm 36 is then depressed downwardly towards the arm 28, until locking indentations 46 are positioned on opposite sides of a curved crown portion 50 of the first arm 28 are moved into alignment with corresponding locking indentations 48 formed in the second arm 36, and, which define a central tooth 52 on the second arm 36. Lateral pressure on the arms 28 and 36 is then removed, this permitting the tooth 52 of the second arm 36 to pass beneath the curved crown portion 50 of the arm 28, which is permitted by the locking indentations 46 and 48.

As shown in FIG. 4, the arms 28 and 36 then assume an in-line position in which they extend parallel to the central portion 24, the arms 28 and 36 having moved in the directions of the arrows B in FIG. 4, but not having returned completely to their initial position as illustrated in FIG. 2, the arms 28 and 36, thus are under a spring bias acting in the directions of the arrows B, this acting to lock the spring clip in its closed position, and acting to prevent unintentional release and opening of the spring clip.

This interfitting relation of the respective arms 28 and 36 is more clearly shown in FIGS. 5, 6, and 7, the securement of the respective arms 28 and 36 relative to each other allowing for limited longitudinal movements of the respective arms 28 and 36 relative to each other, as required in order to accommodate the presence or absence of a pole such as the pole 12 within the arcuate portion 38 of the spring clip.

Referring now to FIGS. 8 to 10, a modification of the arm 36 is shown, the arm 36 at its free end being formed to provide an eyelet 54 in conjunction with the arm 28. By passing the leash 18 through the eyelet 54 in the direction of the arrow C in FIGS. 8 to 10, not only is a more secure attachment for the leash 18 provided, but also, further resistance is provided against unlocking of the arms 28 and 36 under certain adverse circumstances.

The locking interengagement of the arms 36 and 28 can be further improved as illustrated in FIGS. 11 through 15 by forming the free end 56 of the arm 36 with a detent 58 which can ride over the arm 28 during closure of the spring clip, and, which in the fully closed position of the spring clip becomes seated in a locking recess 60 formed in the arm 28.

Once locked, the spring clip cannot be unlocked, unless, as illustrated in FIG. 16, a screwdriver or other pointed instrument 62 is inserted beneath the free end of the second arm 36 and on top of the first arm 28, the screwdriver 62 then being employed to pry and lift the detent 58 out of the locking recess 60, this then permitting release of the arms 28 and 36 relative to each other by moving them in opposite lateral directions.

Figure 17:
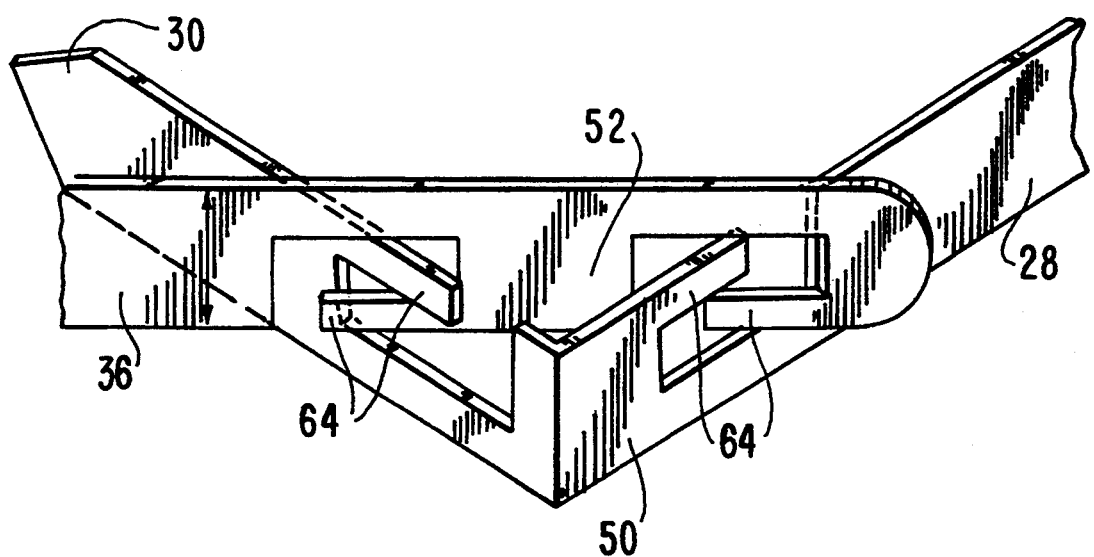
FIG. 17 illustrates an alternative manner in which the arms of the spring clip can be locked against lateral movement relative to each other.

FIG. 17 illustrates an alternative method of locking the arms 28 and 36 to each other.

In FIG. 17, the respective arms 28 and 36, are provided with intermeshing fingers 64, which intermesh upon closing of the spring clip, the axially directed forces stored in the respective arms 36 and 28 then acting to draw the arms 28 and 36 in opposite axial directions in order to intermesh the fingers 64 in the manner illustrated in FIG. 17.

Figure 18:
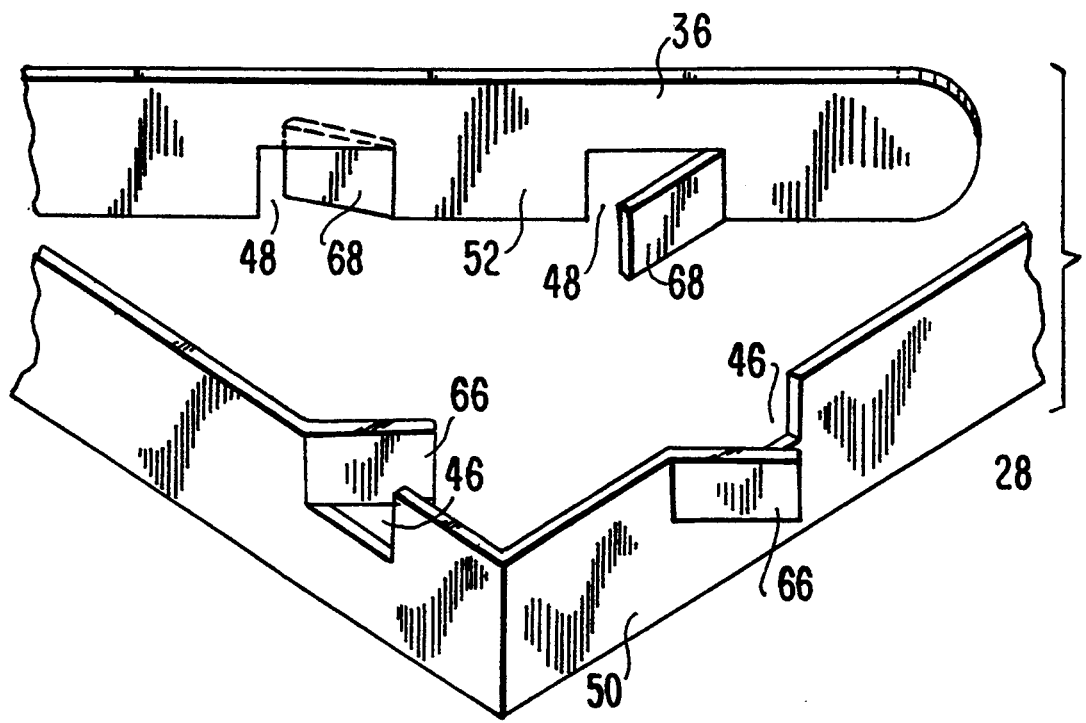
FIG. 18 is an exploded perspective view of an alternative manner in which the arms can be locked against lateral movement relative to each other.
Figure 19:
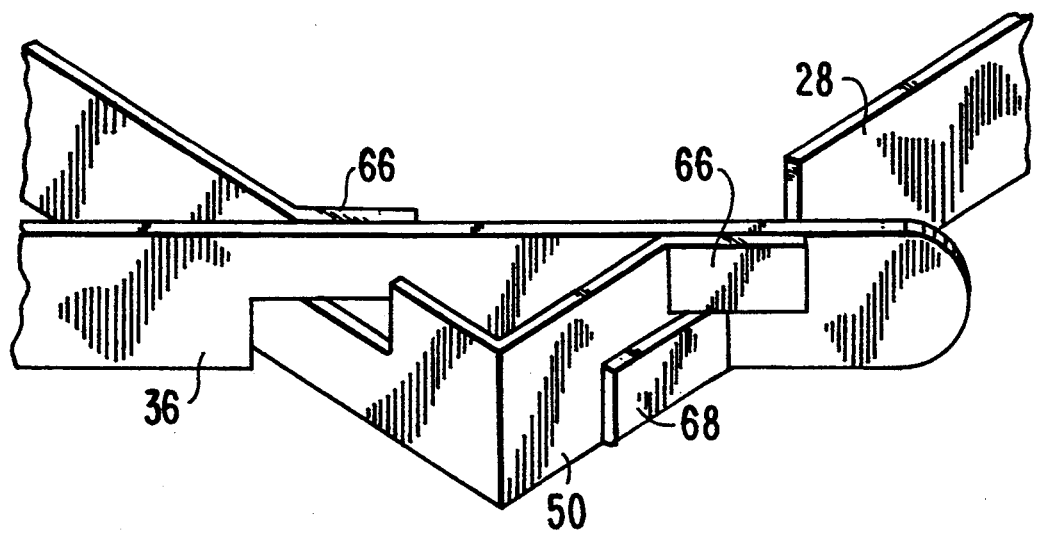
FIG. 19 is a perspective view showing the arms of FIG. 18 when in an interlocked position.

An alternative construction is illustrated in FIGS. 18 and 19, in which the arm 26 is provided with tabs 66 flanking the indentations 46, and, the arm 36 is provided with tabs 68 flanking the indentations 48.

Upon assembly of the arms 28 and 36 into locking arrangement as illustrated in FIG. 19, then, the tabs 66 of the first arm 28, upon relative axial movement between the arms 28 and 36, become positioned over the tabs 68 of the arm 36, thus locking the arms 28 and 36 against relative displacement laterally of each other.

As will be observed, the tabs 68 are bent for them to lie parallel to adjacent surfaces of the first arm 28 when the clip is in a fully locked position, and, the tabs 66 of the arm 28 similarly are bent for them to lie parallel to the arm 36.

By the arrangements above described, the spring clip is locked in its closed position, and, is highly resistant to unlocking of the spring clip under random impact imposed on the spring clip in the event that the tool with its associated spring clip accidentally is dropped, and impacted on projecting members such as window ledges, scaffolding members, ladder rungs and such similar members that may be in the path of free fall of the tool.

While in FIGS. 17 through 19, two sets of intermeshing fingers 64 or locking tabs 66 and 68 have been illustrated, a locking action will be accomplished in the presence of only one set of the intermeshing fingers 64 or locking tabs 66 and 68. The locking action is, however, made even more secure by the provision of the two sets of intermeshing fingers 64 and locking tabs 66 and 68 as illustrated, the provision of dual sets of such members being effective to resist any twisting action that may be imposed on the spring clip by lateral impacts on the arms 28 and 36.

What is claimed is:

1. A spring clip for attachment to a safety leash;

said spring clip being formed from a length of spring steel material providing a central axially continuous portion;

a first arm integral with said central portion at one end of said central portion at one end of said central portion;

a second arm integral with said central portion at an opposite end of said central portion;

interlocking means in the form of a plurality of interfitting teeth formed on each of said first and second arms for securing said arms to each other in a closed position of said spring clip; in which said interfitting teeth inter-fit in a lateral direction in a manner inhibiting axial movement of said first and second arms relative to each other.

2. The spring clip of claim 1, in which said central portion, said first arm and said second arm each lie in a common plane, whereby forces exerted on said spring clip are transmitted throughout said spring clip as tensional forces in said central portion when said spring clip is in said closed position.

3. The spring clip of claim 1, further including an eyelet formed at one end of said central portion for the reception of a leash to be permanently affixed to said spring clip.

4. The spring clip of claim 3, in which an opposite end of said central portion is configured to provide a bight portion said bight portion of said spring clip extending through an aperture in a wall of a tool.

5. The spring clip of claim 4, in which an end of one of said first and second arms is configured as a piercing tool for use in perforating a friction grip formed of an elastomeric material provided on an outer surface of said tool.

6. The spring clip of claim 5, in which said piercing tool is positioned entirely within the confines of said spring clip when said spring clip is in a closed and secured position.

7. The spring clip of claim 1, in which one of said first and second arms is configured to encircle and embrace a peripheral surface of a tool in compressive frictional relation with said peripheral surface of said tool when said spring clip is in a closed and secured position.

8. The spring clip of claim 1, in which said central portion of said spring clip is axially straight between the ends thereof, whereby to transmit forces exerted on one end of said central portion into a tensile force exerted on said central portion, in the absence of lateral and twisting forces.

9. The spring clip of claim 1, in which one of said first and second arms includes a detent for reception under spring force in an aperture provided in the other of said arms when said arms are moved into a closed and secured position, whereby to inhibit unintentional release of said arms from one another.

10. The spring clip of claim 1, in which said first and second arms include locking tabs, which, in the closed and secured position of said spring clip engage each other and prevent lateral movement of said respective arms relative to each other.

11. The spring clip of claim 1 in combination with a leash, in which a spring clip is provided at each end of said leash, one of said spring clips being attachable to a tool, and the other spring clip being attachable to a relatively immovable object, whereby to limit free fall of said tool in the event that it is dropped.

12. The spring clip of claim 1 in combination with a leash, in which said leash is provided with a said spring clip at each end of said leash, one of said spring clips being attached to a tool, the other of said clips being attachable directly to a support member.

13. The spring clip of claim 1 in combination with a leash, in which said leash is provided with a said spring clip at each end of said leash, one of said spring clips being attachable to a tool, the other of said spring clips being attachable to a tool belt worn by a workman.

* * * * *